(12) United States Patent
Huang et al.

(10) Patent No.: US 12,232,081 B2
(45) Date of Patent: Feb. 18, 2025

(54) METHOD AND APPARATUS FOR TRANSMITTING INFORMATION

(71) Applicant: ZTE Corporation, Shenzhen (CN)

(72) Inventors: Ying Huang, Shenzhen (CN); Lin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 690 days.

(21) Appl. No.: 17/267,096

(22) PCT Filed: Aug. 9, 2019

(86) PCT No.: PCT/CN2019/100003
§ 371 (c)(1),
(2) Date: Feb. 9, 2021

(87) PCT Pub. No.: WO2020/030116
PCT Pub. Date: Feb. 13, 2020

(65) Prior Publication Data
US 2021/0185645 A1    Jun. 17, 2021

(30) Foreign Application Priority Data
Aug. 9, 2018    (CN) .......................... 201810905211.8

(51) Int. Cl.
*H04W 72/02*    (2009.01)
*H04W 4/40*    (2018.01)
(Continued)

(52) U.S. Cl.
CPC ............. *H04W 72/02* (2013.01); *H04W 4/40* (2018.02); *H04W 72/0446* (2013.01);
(Continued)

(58) Field of Classification Search
None
See application file for complete search history.

(56) References Cited

U.S. PATENT DOCUMENTS

| 2014/0087663 | A1* | 3/2014 | Burchill | ............. | H04W 52/287 |
| | | | | | 455/522 |
| 2014/0301360 | A1* | 10/2014 | Bontu | ............... | H04W 36/0061 |
| | | | | | 370/331 |

(Continued)

FOREIGN PATENT DOCUMENTS

| CN | 107846434 | 3/2018 |
| CN | 107852716 | 3/2018 |

(Continued)

OTHER PUBLICATIONS

CATT, "Views on NR V2X Study", 3GPP TSG-RAN #80 RP-180919, La Jolla, USA, Jun. 11-14, 2018.
Huawei, HiSilicon, "Sidelink Support & Enhancements for NR", 3GPP TSG RAN WG1 Meeting #86 R1-167207, Gothenburg, Sweden, Aug. 22-26, 2016.
International Search Report for corresponding application PCT/CN2019/100003 filed Aug. 9, 2019; Mail date Oct. 28, 2019.
European Search Report for corresponding application EP19847893 Report dated Jan. 12, 2022.

(Continued)

*Primary Examiner* — Xavier S Wong
(74) *Attorney, Agent, or Firm* — CANTOR COLBURN LLP

(57) ABSTRACT

Provided in the present disclosure are a method and apparatus for transmitting information. The method includes the following operations. A terminal simultaneously performs an NR sidelink service and an LTE sidelink service, and transmits auxiliary information to a base station. The base station can generate resource related information according to the auxiliary information, so as to instruct the terminal to prevent interference between the sidelink services of two systems.

14 Claims, 5 Drawing Sheets

(51) Int. Cl.
*H04W 72/0446* (2023.01)
*H04W 72/0453* (2023.01)
*H04W 72/20* (2023.01)
*H04W 72/541* (2023.01)
*H04W 76/11* (2018.01)
*H04W 76/27* (2018.01)
*H04W 92/18* (2009.01)

(52) U.S. Cl.
CPC ....... *H04W 72/0453* (2013.01); *H04W 72/20* (2023.01); *H04W 72/541* (2023.01); *H04W 76/11* (2018.02); *H04W 76/27* (2018.02); *H04W 92/18* (2013.01)

(56) References Cited

U.S. PATENT DOCUMENTS

| | | | |
|---|---|---|---|
| 2015/0237671 A1* | 8/2015 | Wu ................... | H04W 36/0007 370/328 |
| 2015/0296526 A1* | 10/2015 | Behravan ............... | H04L 43/16 370/329 |
| 2017/0295579 A1 | 10/2017 | Sheng | |
| 2018/0054237 A1 | 2/2018 | Tseng | |
| 2018/0092085 A1* | 3/2018 | Shaheen ............... | H04W 36/14 |
| 2018/0103460 A1 | 4/2018 | Sharma et al. | |
| 2019/0230497 A1* | 7/2019 | Ljung ..................... | H04W 8/22 |
| 2019/0281641 A1* | 9/2019 | Cheng .................... | H04L 41/08 |
| 2020/0029202 A1* | 1/2020 | Baghel ................. | H04W 72/23 |

FOREIGN PATENT DOCUMENTS

| | | |
|---|---|---|
| CN | 108307489 | 7/2018 |
| WO | 2017133644 | 8/2017 |
| WO | 2017173133 A1 | 10/2017 |
| WO | 2017192006 A2 | 11/2017 |
| WO | 2018059486 | 4/2018 |
| WO | 2018064179 A1 | 4/2018 |
| WO | 2018084590 | 5/2018 |

OTHER PUBLICATIONS

LTE; ETSI TS 136 331 V13.0.0 (Jan. 2016) 3rd Generation Partnership Project;Technical Specification Group Radio Access Network; Evolved Universal Terrestrial Radio Access (E-UTRA);Radio Resource Control (RRC); Protocol specification.
Motorola Mobility, "Update to Key Issue #2-Cell Selection in case UE supports multiple V2X applications each operating on different PC5 RAT or carrier frequency", May 28-Jun. 1, 2018.
ZTE Corporation, Discussion on Rel-14 and Rel-15 V2X coexistence issues3GPP TSG RAN WG2 Meeting #101 R2-1801963 Athens, Greece, Feb. 26-Mar. 2, 2018.
3rd Generation Partnership Project; Technical Specification Group Radio Access Networks;Evolved Universal Terrestrial Radio Access (E-UTRA); Study on signaling and procedure for interference avoidance for in-device coexistence; (Release 10) 3GPP TR 36.816 v1.3.0 1 (2011-045).
3GPP TSG RAN WG1 Meeting #86, 3GPP TSG RAN WG1 Meeting #86 R1-167207Gothenburg, Sweden, Aug. 22-26. 2016, R1-167207 Gothenburg, Sweden, Aug. 22-26, 2016.
3GPP TSG RAN WG1 Meeting #89 R1-1707307, Considerations on Support of Short TTI for LTE V2V Sidelink Communication Hangzhou, P.R. China May 15-19, 2017.
3GPP TSG RAN WG1 Meeting #89, Considerations on Support of Short TTI for LTE V2V SidelinkCommunication, R1-1707307 Hangzhou, P.R. China May 15-19, 2017.
3GPP TSG RAN WG2 Meeting #101 R2-1803599, Transmit less-than-expected data for configured V2X sidelink grant Tor transmission of multiple MAC PDUs, Athens, Greece, 26 Feb.-Mar. 2, 2018.
3GPP TSG RAN#75, Discussion on NR sidelink, RP-170357 Dubrovnik, Croatia, Mar. 6-9, 2017.
3GPP TSG RAN WG2 Meeting #99 R2-1708524 Berlin, Germany, Aug. 21-25, 2017.

* cited by examiner

Transmitting, by a first terminal which simultaneously performs an NR sidelink service and an LTE sidelink service, auxiliary information to a first base station — S402

METHOD AND APPARATUS FOR TRANSMITTING INFORMATION

The present disclosure claims the priority of Chinese Patent Application No. 201810905211.8, filed to the China National Intellectual Property Administration (CNIPA) on Aug. 9, 2018, which is incorporated in its entirety herein by reference.

TECHNICAL FIELD

The present disclosure relates to the field of communication, for example, relates to a method and apparatus for transmitting information.

BACKGROUND

In the related art, for the same user equipment (UE), a vehicle to everything (V2X) service provided by a new radio (NR) sidelink and a V2X service provided by a long term evolution (LTE) sidelink may be used simultaneously. FIG. 1 is a schematic diagram of the Internet of Vehicles according to the related art. As shown in FIG. 1, the UE may use the LTE sidelink and/or the NR sidelink in an LTE-only coverage scene, and the UE may also use the LTE sidelink and/or the NR sidelink in a no coverage scene.

FIG. 2 is a schematic diagram of data transmission between terminals in the Internet of Vehicles according to the related art. As shown in FIG. 2, in FIG. 2A, UE sends LTE sidelink discovery or communication data to UE2, and at the same time, sends NR sidelink discovery or communication data to UE3. In FIG. 2B, UE1 receives LTE sidelink discovery or communication data sent by UE2, and at the same time, sends NR sidelink discovery or communication data to UE3. For UE1, sending of the NR sidelink and sending or reception of the LTE sidelink may overlap in a time-domain position. In FIG. 2A, under the condition of sending of the NR sidelink and the LTE sidelink in the same time-domain resource, a maximum sending power of the UE is limited, the sending power needs to be allocated among a plurality of links, and there may be large interference for a reception end. In FIG. 2B, sending of the NR sidelink is likely to cause large interference to reception of the LTE sidelink. In FIG. 2B, UE1 may send the LTE sidelink discovery or communication data to UE3, and receive the NR sidelink discovery or communication data from UE2. The LTE/NR sidelink discovery or communication data may be user plane or control plane data packets.

As for the problem that interference exists when the terminal carries out sidelink services of multiple systems in the related art, no effective solution has been proposed at present.

SUMMARY

The embodiment of the present disclosure provides a method and apparatus for transmitting information, which may solve the problem that interference exists when the terminal carries out sidelink services of multiple systems in the related art.

According to the embodiment of the present disclosure, provided is a method for transmitting information, including: transmitting auxiliary information to a first base station by a first terminal which simultaneously performs an NR sidelink service and an LTE sidelink service, wherein the auxiliary information is configured for the first base station to generate resource related information.

According to another embodiment of the present disclosure, provided is a method for transmitting information, including: transmitting auxiliary information to a second terminal by a first terminal which simultaneously performs an NR sidelink service and an LTE sidelink service.

According to another embodiment of the present disclosure, provided is a method for transmitting information, including: obtaining, by a first base station, auxiliary information transmitted by a first terminal, wherein the first terminal is a terminal which simultaneously performs an NR sidelink service and an LTE sidelink service; and transmitting first resource related information to a second base station by the first base station, wherein the first resource related information is determined according to the auxiliary information.

According to another embodiment of the present disclosure, provided is a method for transmitting information, including: receiving priority related information by a first terminal; and determining a priority sequence between an LTE sidelink and an NR sidelink.

According to another embodiment of the present disclosure, provided is an apparatus for transmitting information, applied to a terminal which simultaneously performs an NR sidelink service and an LTE sidelink service, including: a first transmission module, configured to transmit auxiliary information to a first base station, wherein the auxiliary information is configured for the first base station to generate resource related information.

According to another embodiment of the present disclosure, provided is an apparatus for transmitting information, applied to a terminal which simultaneously performs an NR sidelink service and an LTE sidelink service, including: a second transmission module, configured to transmit auxiliary information to a second terminal.

According to another embodiment of the present disclosure, provided is an apparatus for transmitting information, including: a third obtaining module, configured to obtain auxiliary information transmitted by a first terminal, wherein the first terminal is a terminal which simultaneously performs an NR sidelink service and an LTE sidelink service; and a third transmission module, configured to transmit first resource related information to a second base station, wherein the first resource related information is determined according to the auxiliary information.

According to another embodiment of the present disclosure, provided is an apparatus for transmitting information, including: a fourth reception module, configured to receive priority related information; and a fourth determination module, configured to determine a priority sequence between an LTE sidelink and an NR sidelink.

According to yet another embodiment of the present disclosure, provided is storage medium, wherein the storage medium stores a computer program, and the computer program is configured to execute the operation of any one of the method embodiments described above.

According to yet another embodiment of the present disclosure, provided is an electronic apparatus, including a memory and a processor, wherein the memory stores a computer program, and the processor is configured to run the computer program to execute the operation of any one of the method embodiments described above.

BRIEF DESCRIPTION OF THE DRAWINGS

The accompanying drawings described herein are used to provide a deeper understanding of the present disclosure, and constitute a part of the present disclosure. The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMBODIMENTS

It is to be noted that the terms "first", "second" and the like in the specification, the claims and the drawings of the present disclosure are used to distinguish similar objects, and are not used to describe a specific sequence or a precedence order.

Embodiment 1

The embodiment of the present disclosure provides a mobile communication network (including a 5G mobile communication network and an LTE mobile communication network). A network architecture of the network may include a network-side device (for example, a base station) and a terminal. The embodiment of the present disclosure provides a method for transmitting information capable of running on the network architecture. A running environment of the method for transmitting information provided by the embodiment of the present disclosure is not limited to the network architecture described above. In some embodiments, a scene of the present disclosure is the Internet of Vehicles.

Figures 3, 4:
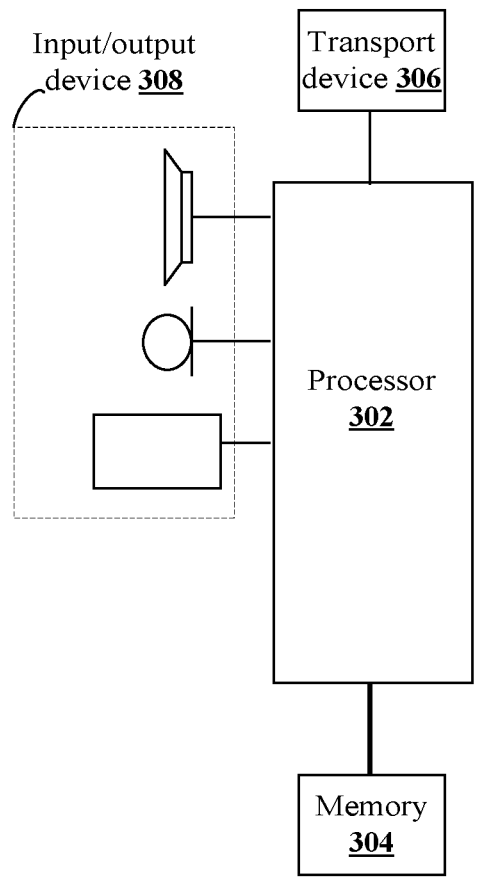
FIG. 3 is a block diagram showing the hardware structure of a mobile terminal of a method for transmitting information of an embodiment of the present disclosure.
FIG. 4 is a flow chart of a method for transmitting information according to an embodiment of the present disclosure.

The method embodiment provided by the embodiment 1 of the present disclosure may be executed in a mobile terminal, a computer terminal or a similar computing apparatus. For example, the method runs on the mobile terminal. FIG. 3 is a block diagram showing the hardware structure of the mobile terminal of the method for transmitting information of the embodiment of the present disclosure. As shown in FIG. 3, the mobile terminal 30 may include one or more (only one is shown in FIG. 3) processors 302 (the processor 302 may include a processing apparatus, for example, a microprocessor MCU or a programmable logic device FPGA) and a memory 304 for storing data. In some embodiments, the mobile terminal may further include a transmission apparatus 306 with a communication function and an input/output device 308. A person having ordinary skill in the art will appreciate that the structure shown in FIG. 3 is merely schematic and does not pose a limitation on the structure of the mobile terminal described above. For example, the mobile terminal 30 may further include more or fewer assembly than that shown in FIG. 3, or have a different configuration from that shown in FIG. 3.

The memory 304 may be used for storing software programs and modules of application software, for example, program instructions/modules corresponding to the method for transmitting information in the embodiment of the present disclosure. The processor 302 executes various functional applications and data processing by running the software programs and modules stored in the memory 304, so as to achieve the method. The memory 304 may include a high-speed random access memory, and may further include a non-volatile memory, for example, one or more magnetic storage apparatuses, flash memories, or other non-volatile solid-state memories. In some examples, the memory 304 further includes a memory remotely disposed with respect to the processor 302. The remote memory may be connected to the mobile terminal 30 by means of a network. Examples of networks described above include the Internet, enterprise intranets, local area networks, mobile communication networks, and combinations thereof.

A transmission apparatus 306 is configured to receive or transmit data by means of one network. Specific examples of the network described above may include a wireless network provided by a communications provider of the mobile terminal 30. In one example, the transmission apparatus 306 includes a network interface controller (NIC), and the transmission apparatus 306 may be connected with other network devices by means of a base station so as to communicate with the Internet. In one example, the transmission apparatus 306 may be a radio frequency (RF) module, and the transmission apparatus 306 is used to communicate wirelessly with the Internet.

The present embodiment provides a method for transmitting information. FIG. 4 is a flow chart of the method for transmitting information according to the embodiment of the present disclosure. As shown in FIG. 4, the method includes the following operation.

At operation S402, a first terminal which simultaneously performs an NR sidelink service and an LTE sidelink service transmits auxiliary information to a first base station.

In the operation described above, the auxiliary information is configured for the first base station to generate resource related information.

By means of the operation described above, a terminal, which simultaneously performs an NR sidelink service and an LTE sidelink service, transmits auxiliary information to a base station, and the base station may generate resource related information according to the auxiliary information, so as to instruct the terminal to prevent interference between the sidelink services of two systems. By employing the solution, the interference among the sidelink services of a plurality of systems is prevented, the data transmission efficiency is improved, and the problem that interference exists when the terminal carries out the sidelink services of the plurality of systems in the related art is solved.

In some embodiments, the auxiliary information includes at least one of the following: indication information of in-device coexistence (IDC) capability, an IDC indication, affected service type information, service type information of an interference source, information of an affected system, information of a system of interference source, indication information of an interference type, affected frequency domain information, frequency domain information of the interference source, affected time domain information, time domain information of the interference source, affected resource pool information, resource pool information of the interference source, suggested frequency domain information, suggested time domain information, suggested resource pool information, time division multiplexing (TDM) auxiliary information, sending power information for an LTE sidelink, sending power information for an NR sidelink, sending power difference information, identification information of opposite end UE, identification information of a base station or cell serving the opposite end UE, affected sidelink BWP information, interference source sidelink bandwidth part (BWP) information, and suggested sidelink BWP information.

In some embodiments, before transmitting the auxiliary information to the first base station by the first terminal, the first terminal receives configuration information sent by the first base station. The configuration information includes at least one of the following: indication information allowing the first terminal to transmit the auxiliary information; a specified length of time; an amount of time, within which it is allowed to perform no sending on configured resources, in the specified length of time; a sidelink related priority sequence list; a mapping relation between a sidelink service flow priority level and a prose per packet priority (PPPP); a mapping relation between the PPPP and a logical channel priority level; a mapping relation between the PPPP and 5QI; a mapping relation between the PPPP and a QoS flow ID (QFI); a mapping relation between the PPPP and a destination identifier (ID); a priority threshold value; and a threshold value for a sending power difference between NR sidelink and LTE sidelink.

The specified length of time in the embodiment described above takes frame or subframe or slot or symbol as a unit.

The amount of time, within which it is allowed to perform no sending on the configured resources, in the specified length of time takes frame or subframe or slot or symbol as a unit.

In some embodiments, before transmitting the auxiliary information to the first base station by the first terminal, the auxiliary information is determined to be transmitted to the first base station when determining that the first terminal meets at least one of the following conditions: the first terminal determines that the first terminal has an IDC problem and is not able to solve the IDC problem by itself; a priority value of an NR sidelink and/or an LTE sidelink is smaller than a priority threshold value; the priority value of the NR sidelink and/or the LTE sidelink is larger than a priority threshold value; and a sending power difference of the first terminal in the NR sidelink and the LTE sidelink is larger than a threshold value.

Transmission in the present disclosure can be understood as sending and receiving. The threshold value may be preset or indicated in the configuration information sent by the base station. The threshold value may be set differently for each service, may be set specifically for a sending service or a receiving service, etc., and may also be set based on other service distinguishing.

In some embodiments, after transmitting the auxiliary information to the first base station by the first terminal, resource related information transmitted by the first base station is received. The resource related information includes at least one of the following: frequency domain information of an LTE sidelink or an NR sidelink; time domain information of the LTE sidelink or the NR sidelink; resource pool information of the LTE sidelink or the NR sidelink; information indicating that a time domain resource or a frequency domain resource or a resource pool is used for sending; information indicating that the time domain resource or the frequency domain resource or the resource pool is used for reception; communication system information; sidelink BWP information; and beam related information.

The communication system information in the present disclosure may include one of the following: LTE, NR, R14, R15, or R16.

In some embodiments, the frequency domain information includes one of the following: frequency point information, resource block information, index information, a position of an initial RB, the number of sub-channels, or the number of RBs.

The time domain information includes one of the following: frame information, subframe information, slot information, symbol information, time domain pattern information, time domain index information, offset information, or period information.

The resource pool information includes one of the following: the time domain information, the frequency domain information, resource pool index information, version information, or radio access technology (RAT) information.

The sidelink BWP information includes one of the following: a BWP index, a BWP bandwidth, a BWP position, subcarrier spacing, or a CP.

In some embodiments, the first terminal forwards the resource related information to a second terminal. For example, the first terminal forwards the resource related information to the second terminal by means of PC5 interface signaling, or PC5 interface radio resource control (RRC) signaling, or media access control (MAC) address layer information, or physical (PHY) layer information.

In some embodiments, when both the first terminal and a second terminal are served by the first base station, the first terminal and/or the second terminal receives the resource related information transmitted by the first base station.

According to another embodiment of the present disclosure, provided is a method for transmitting information, including the following operation.

At operation 110, a first terminal which simultaneously performs an NR sidelink service and an LTE sidelink service transmits auxiliary information to a second terminal.

By employing the solution, the first terminal transmits the auxiliary information to the second terminal, which provides a basis for returning resource related information to the second terminal. This scheme can prevent the interference among the sidelink services of a plurality of systems, improves the data transmission efficiency, and solves the problem that interference exists when the terminal carries out the sidelink services of the plurality of systems in the related art.

The second terminal may generate the resource related information according to the auxiliary information.

In some embodiments, after transmitting the auxiliary information to the second terminal, resource related information transmitted by the second terminal is received. The resource related information includes at least one of the following:

frequency domain information of an LTE sidelink or an NR sidelink;
time domain information of the LTE sidelink or the NR sidelink;
resource pool information of the LTE sidelink or the NR sidelink;
information indicating that a time domain resource or a frequency domain resource or a resource pool is used for sending; information indicating that the time domain resource or the frequency domain resource or the resource pool is used for reception;
communication system information;
sidelink BWP information; and
beam related information.

According to another embodiment of the present disclosure, provided is a method for transmitting information, including the following operations.

At operation 210, a first base station obtains auxiliary information transmitted by a first terminal. Herein, the first terminal is a terminal which simultaneously performs an NR sidelink service and an LTE sidelink service.

At 220, the first base station transmits first resource related information to a second base station. Herein, the first resource related information is determined according to the auxiliary information.

By employing the solution, the interference among the sidelink services of a plurality of systems is prevented, the data transmission efficiency is improved, and the problem that interference exists when the terminal carries out the sidelink services of the plurality of systems in the related art is solved.

In some embodiments, the auxiliary information includes at least one of the following: indication information of IDC capability, an IDC indication, affected service type information, service type information of an interference source, information of an affected system, information of a system of interference source, indication information of an interference type, affected frequency domain information, frequency domain information of the interference source, affected time domain information, time domain information of the interference source, affected resource pool information, resource pool information of the interference source, suggested frequency domain information, suggested time domain information, suggested resource pool information, TDM auxiliary information, sending power information for an LTE sidelink, sending power information for an NR sidelink, sending power difference information, identification information of opposite end UE, identification information of a base station or cell serving the opposite end UE, affected sidelink BWP information, sidelink BWP information of the interference source, and suggested sidelink BWP information.

In some embodiments, the first resource related information includes at least one of the following: an IDC indication, frequency domain information of a resource used by a sidelink, time domain information of the resource used by the sidelink, resource pool information of the resource used by the sidelink, affected sidelink BWP information, sidelink BWP information of the interference source, suggested sidelink BWP information, affected service type information, service type information of an interference source, information of an affected system, information of a system of interference source, indication information of an interference type, affected frequency domain information, frequency domain information of the interference source, affected time domain information, time domain information of the interference source, affected resource pool information, resource pool information of the interference source, suggested frequency domain information, suggested time domain information, suggested resource pool information, and TDM auxiliary information. The resource used by the sidelink is a resource used by an LTE sidelink or an NR sidelink configured by the first base station for the first terminal.

In some embodiments, after the first base station transmits the first resource related information to the second base station, second resource related information transmitted by the second base station is received. The second resource related information includes at least one of the following:
frequency domain information of an LTE sidelink or an NR sidelink;
time domain information of the LTE sidelink or the NR sidelink;
resource pool information of the LTE sidelink or the NR sidelink;
information indicating that a time domain resource or a frequency domain resource or a resource pool is used for sending; information indicating that the time domain resource or the frequency domain resource or the resource pool is used for reception;
communication system information;
sidelink BWP information; and
beam related information.

In some embodiments, after receiving the second resource related information transmitted by the second base station, the first base station transmits the second resource related information to the first terminal.

According to another embodiment of the present disclosure, provided is a method for transmitting information, including the following operations.

At operation 310, a first terminal receives priority related information.

At operation 320, a priority sequence between an LTE sidelink and an NR sidelink is determined.

By employing the solution, the interference among the sidelink services of a plurality of systems is prevented, the data transmission efficiency is improved, and the problem that interference exists when the terminal carries out the sidelink services of the plurality of systems in the related art is solved.

In some embodiments, the priority related information includes at least one of the following: a sidelink related priority sequence list; a mapping relation between a sidelink service flow priority level and a prose per packet priority (PPPP); a mapping relation between the PPPP and a logical channel priority level; a mapping relation between the PPPP and 5QI; a mapping relation between the PPPP and QFI; and a mapping relation between the PPPP and a destination ID.

The scheme is described in conjunction with another embodiment of the present disclosure.

The auxiliary information includes at least one of the following:
indication information of IDC capability, an IDC indication, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, TDM auxiliary information, sending power information for an LTE sidelink, sending power information for an NR sidelink, sending power difference information, identification information of opposite end UE, identification information of a base station or cell serving the opposite end UE, affected sidelink BWP information, sidelink BWP information of the interference source, and suggested sidelink BWP information.

Before sending the auxiliary information to a base station, the UE receives configuration information sent by the base station. The configuration information at least includes one of the following: indication information allowing sending of the auxiliary information; a length of time which takes frame or subframe or slot or symbol as a unit; an amount of time, within which it is allowed to perform no sending on configured resources, in the specified length of time, wherein the amount of time takes frame or subframe or slot or symbol as a unit; a priority sequence of a sidelink service; a sidelink related priority sequence list; a mapping between a priority level and a PPPP; a mapping between the PPPP and a logical channel priority; a priority threshold value; and a threshold value for the sending power difference between two links.

After receiving the auxiliary information sent by the UE, the base station sends resource related information to the UE. The resource related information at least includes one of the following: frequency domain information of an LTE sidelink or an NR sidelink, which may include one of the following: frequency point information, resource block information, or index information; time domain information of the LTE sidelink or the NR sidelink, which may include one of the following: frame information, subframe information, slot information, symbol information, time domain (frame/subframe/slot/symbol) pattern information, time domain (frame/subframe/slot/symbol) index information, offset information, or period information; resource pool information of the LTE sidelink or the NR sidelink, which may include one of the following: time domain information, frequency domain information, or resource pool index information; a sending or receiving indication; and system information, including one of the following: LTE, NR, R14, R15, or R16.

In the present disclosure, the base station is a functional entity having a function of controlling or scheduling the UE, for example, may be LTE eNB or NR gNB, or ng-eNB, or en-gNB, or gNB-DU, or gNB-CU.

A V2X service at least includes one of the following services: a sidelink, a discovery, or sidelink communication.

The V2X service may use an LTE V2X system or an NR V2X system.

The V2X service may be achieved by means of unicast, multicast or broadcast.

Sending resources of the V2X service may be allocated by the base station or determined by the UE in an autonomous selection mode.

Besides, the UE may access the network in a dual-connection mode, and the base station of the present disclosure may be a main base station or a secondary base station. If the base station is the secondary base station, RRC signaling interaction between the UE and the secondary base station may be transmitted by means of the main base station. For example, for the auxiliary information sent by the UE to the base station, the UE may send the auxiliary information to the main base station by means of an RRC message, and then the main base station sends the auxiliary information to the secondary base station by means of an X2 or Xn message.

The following are exemplary embodiments of the present disclosure.

Exemplary Embodiment 1

Figure 1:
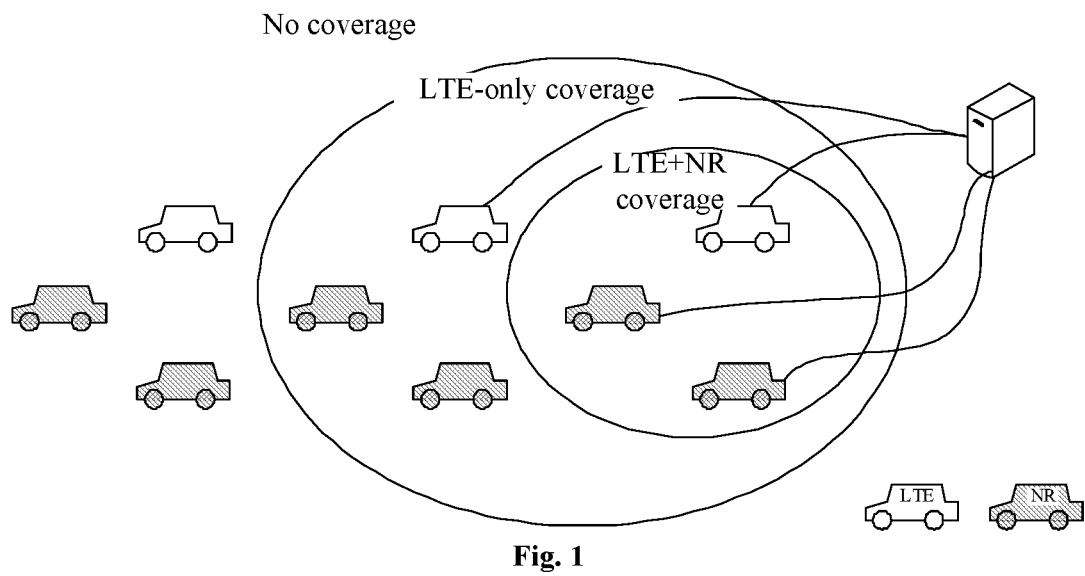
FIG. 1 is a schematic diagram of the Internet of Vehicles according to the related art.
Figure 2:
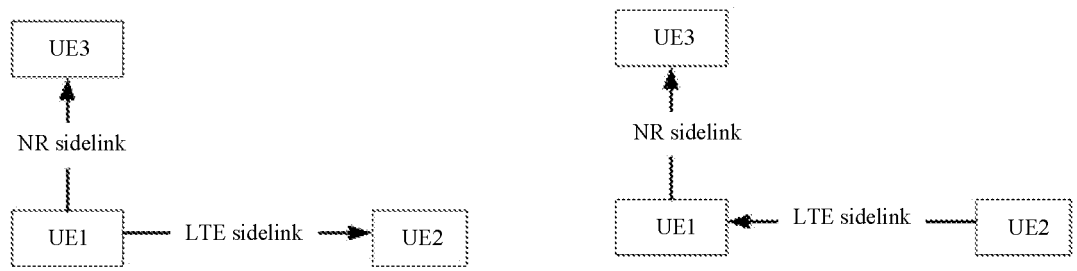
FIG. 2 is a schematic diagram of data transmission between terminals in the Internet of Vehicles according to the related art.

The embodiment is a first method for achieving coexistence of LTE V2X and NR V2X by a base station on the basis of auxiliary information reported by UE. FIG. 2 is a schematic diagram of a scene of the present embodiment. In this embodiment, UE1 is served by the base station, UE2 or UE3 may be served by that base station or by another base station (for example, a neighbouring base station). In FIG. 2A, UE1 sends LTE sidelink discovery or communication data to UE2, while UE1 sends NR sidelink discovery or communication data to UE3. In FIG. 2B, UE1 receives LTE sidelink discovery or communication data sent by UE2, while UE1 sends NR sidelink discovery or communication data to UE3. For UE1, sending of the NR sidelink and sending or reception of the LTE sidelink may overlap in a time-domain position. For example, in FIG. 2A, under the condition of sending of the NR sidelink and the LTE sidelink in the same time-domain resource, a maximum sending power of the UE is limited, the sending power needs to be allocated among a plurality of links, and there may be large interference to a reception end.

In FIG. 2B, the sending of the NR sidelink is likely to cause large interference to the reception of the LTE sidelink. The method of the embodiment is also applicable under the condition that the NR sidelink is replaced by the LTE sidelink and the LTE sidelink is replaced by the NR sidelink.

Figure 5:
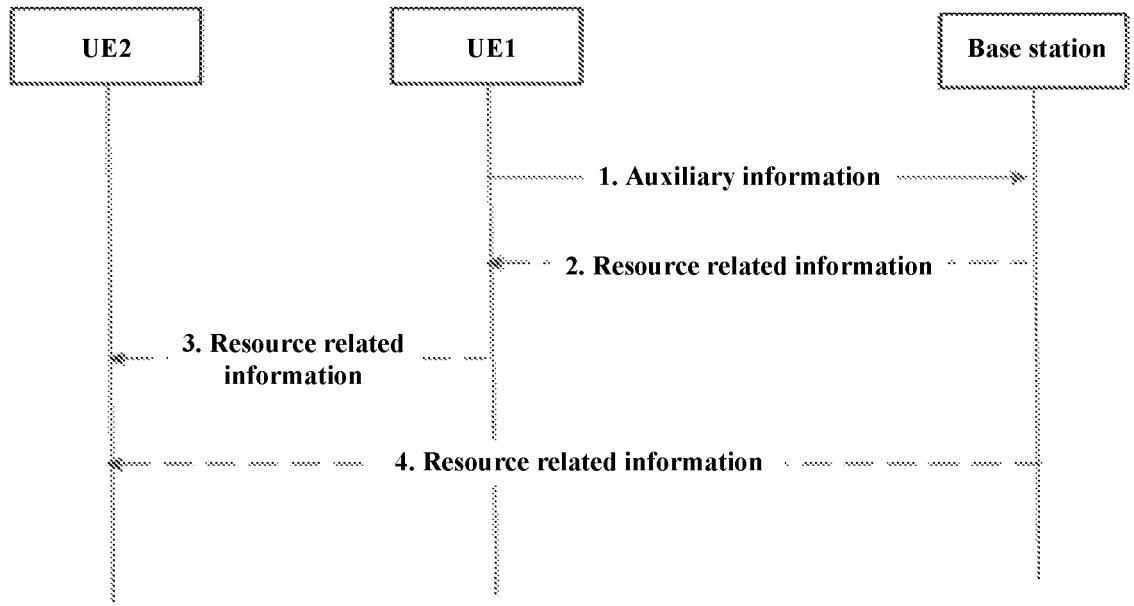
FIG. 5 is a schematic diagram of a scene according to exemplary embodiment 1 of the present disclosure.

FIG. 5 is a schematic diagram of a scene according to the exemplary embodiment 1 of the present disclosure. As shown in FIG. 5, the method of the embodiment includes the following operations.

At operation 1, UE1 sends auxiliary information to a base station. The auxiliary information at least includes one of the following:

indication information of IDC capability, an IDC indication, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, TDM auxiliary information, sending power information for an LTE sidelink, sending power information for an NR sidelink, sending power difference information, identification information of opposite end UE, identification information of a base station or cell serving the opposite end UE, affected sidelink BWP information, sidelink BWP information of the interference source, and suggested sidelink BWP information.

In some embodiments, the service type information includes one of the following: service type indication information, service identification information, unicast indication information, multicast indication information, broadcast indication information, basic safety indication information, discovery indication information, or communication indication information.

In some embodiments, the system information includes one of the following: LTE, NR, R14, R15, or R16.

In some embodiments, the indication information of an interference type includes one of the following: simultaneous sending, simultaneous transceiving, transmitting indication information, and receiving indication information.

In some embodiments, the frequency domain information includes one of the following: frequency point information, resource block information, or index information.

In some embodiments, the time domain information includes one of the following: frame information, subframe information, slot information, symbol information, time domain (frame/subframe/slot/symbol) pattern information, time domain (frame/subframe/slot/symbol) index information, offset information, or period information.

In some embodiments, the sending power difference information is a power difference between two links, wherein power is sending or receiving power.

In some embodiments, the opposite end UE is UE that performs a V2X service with UE, and the identification information of the opposite end UE includes one piece of the following: proSe UE identification, or C-RNTI, or index information.

In some embodiments, the resource pool information includes one of the following: time domain information, frequency domain information, or resource pool index information.

In some embodiments, before UET sends the identification information of the opposite end UE and the identification information of the base station or cell serving the opposite end UE to the base station, UE1 obtains the UE identification information of the opposite end UE and the identification information of the base station or cell serving the opposite end UE from the opposite end UE, for example, from a PC5 interface PC5 message or RRC message or discovery message.

In some embodiments, the TDM auxiliary information includes one of the following: a DRX cycle length, a DRX offset, or a DRX activation time.

In some embodiments, the auxiliary information may be sent by means of the RRC message.

In some embodiments, UET sends the auxiliary information to the base station after meeting at least one of the following conditions:

Condition 1: the UE has an IDC problem which is not able to be solved by itself.

Condition 2: a priority value of the LTE sidelink and/or the NR sidelink is smaller than a priority threshold value. The priority threshold value may be configured by the base station or the V2X server for the UE, or a predefined value. The priority threshold value may be a PPPP value, or a logical channel priority threshold value, or a priority level threshold value.

Condition 3: a sending power difference of the UE in the LTE sidelink and the NR sidelink is larger than a configured threshold value for the sending power difference. The threshold value may be configured by the base station or the V2X server for the UE, or is a predefined value. In some embodiments, the UE may be configured with a threshold value for the sending power difference and a corresponding V2X service type (which may be represented by V2X service type, or V2X service identification, or destination ID).

At operation 1a, in some embodiments, before UET sends the auxiliary information to the base station, UE1 receives configuration information sent by the base station. The configuration information includes one of the following:

indication information allowing sending of the auxiliary information;
a length of time which takes frame or subframe or slot or symbol as a unit;
an amount of time, within which it is allowed to perform no sending on configured resources, in the specified length of time, wherein the amount of time takes frame or subframe or slot or symbol as a unit;
a priority sequence of a sidelink service;
a mapping between a priority level and a PPPP;
a mapping between the PPPP and a logical channel priority;
a priority threshold value; and
a threshold value for the sending power difference between two links.

In some embodiments, the base station may send the auxiliary information to UET by means of RRC messages, or system messages, or MAC layer information, or PHY layer information.

At operation 2, the base station sends resource related information to UE after receiving the auxiliary information sent by UE1.

The resource related information includes one of the following:

frequency domain information of an LTE sidelink or an NR sidelink, which may include one of the following: frequency point information, resource block information, or index information;
time domain information of the LTE sidelink or the NR sidelink, which may include one of the following: frame information, subframe information, slot information, symbol information, time domain (frame/subframe/slot/symbol) pattern information, time domain (frame/subframe/slot/symbol) index information, offset information, or period information;
resource pool information of the LTE sidelink or the NR sidelink, which may include one of the following: time domain information, frequency domain information, or resource pool index information;
a sending or receiving indication; or
system information, including one of the following: LTE, NR, R14, R15, or R16.

In some embodiments, the base station may send the resource related information to UE1 by means of the RRC messages, or the system messages, or the MAC layer information, or the PHY layer information.

At operation 3, in some embodiments, UE1 sends the resource related information to UE2 or UE3 by means of a PC5 interface. UE2 or UE3 determines a sidelink discovery/communication sending or reception resource according to the resource related information. In some embodiments, UE1 may send the resource related information to UE2 or UE3 by means of PC5 interface signaling, or PC5 interface RRC signaling, or MAC layer information, or PHY layer information (for example, sidelink control information).

At operation 4, in some embodiments, under the condition that UE2 (or UE3) and UE1 are served by the same base station, the base station sends the resource related information to UE2 or UE3. UE2 or UE3 determines a sidelink discovery/communication sending or reception resource according to the resource related information.

It is noted that the chronological order between the above operations is not limited.

Exemplary Embodiment 2

The embodiment is a second method for achieving coexistence of LTE V2X and NR V2X by a base station on the basis of auxiliary information reported by UE. FIG. 2B is a schematic diagram of a scene of the present embodiment. In this embodiment, UE1 and UE2 are both served by the base station. UE1 receives LTE sidelink discovery or communication data sent by UE2, while UE1 sends NR sidelink discovery or communication data to UE3. For UE1, sending of the NR sidelink and reception of the LTE sidelink may overlap in a time-domain position, and the sending of the NR sidelink may cause interference to the reception of the LTE sidelink. The method is further suitable for the condition that UE1 receives the NR sidelink discovery or communication data from UE2 and meanwhile sends the LTE sidelink discovery or communication data to UE3.

Figure 6:
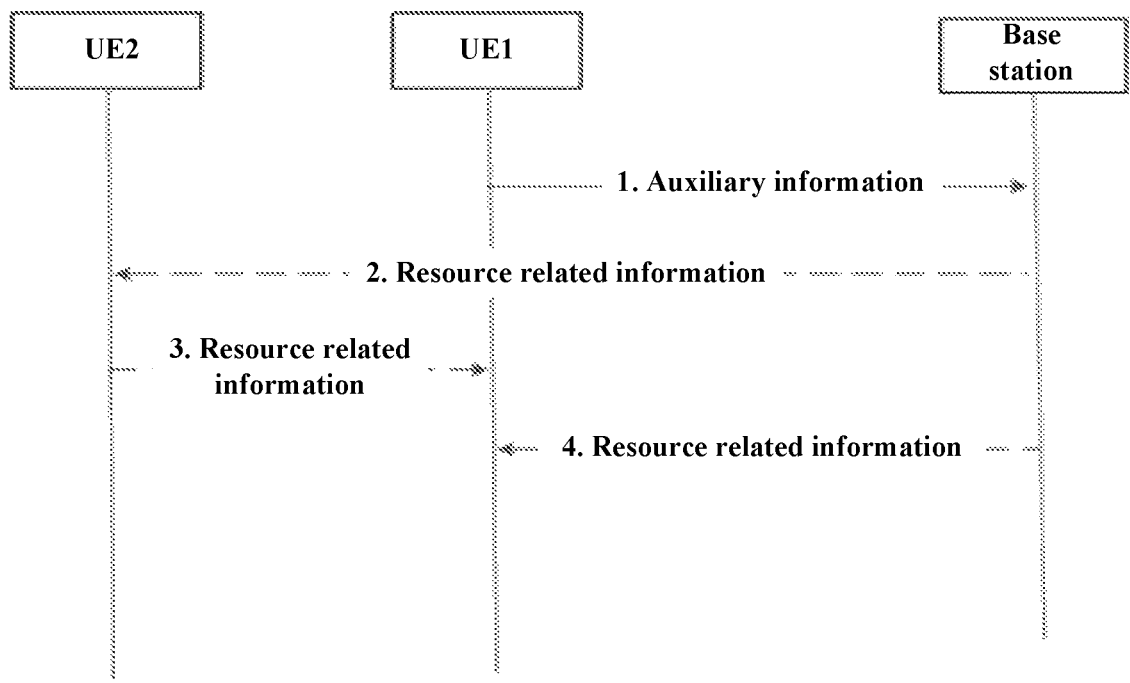
FIG. 6 is a schematic diagram of exemplary embodiment 2 according to the present disclosure.

FIG. 6 is a schematic diagram of the exemplary embodiment 2 according to the present disclosure. As shown in FIG. 6, the method of the embodiment includes the following operations.

At operation 1, UE1 sends auxiliary information to a base station. The auxiliary information at least includes one of the following:

indication information of IDC capability, an IDC indication, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, TDM auxiliary information, identification information of opposite end UE, identification information of a base station or cell serving the opposite end UE, affected sidelink BWP information, sidelink BWP information of the interference source, and suggested sidelink BWP information. Specific meanings or values of the above information are set forth in the embodiment 1.

In some embodiments, UE1 sends the auxiliary information to the base station after meeting at least one of the following conditions:

Condition 1: the UE has an IDC problem which is not able to be solved by itself.

Condition 2: a priority value of the LTE sidelink and/or the NR sidelink is smaller than a priority threshold value. The priority threshold value may be configured by the base station or the V2X server for the UE, or a predefined value.

Condition 3: a sending power difference of the UE in the LTE sidelink and the NR sidelink is larger than a configured threshold value for the sending power difference. The threshold value may be configured by the base station or the V2X server for the UE, or is a predefined value. In some embodiments, the UE may be configured with a threshold value for the sending power difference and a corresponding V2X service type (which may be represented by V2X service type, or V2X service identification, or destination ID).

At operation 1a, in some embodiments, before UE1 sends the auxiliary information to the base station, UE1 receives configuration information sent by the base station. The configuration information includes one of the following:

indication information allowing sending of the auxiliary information;
a length of time which takes frame or subframe or slot or symbol as a unit;
an amount of time, within which it is allowed to perform no sending on configured resources, in the specified length of time, wherein the amount of time takes frame or subframe or slot or symbol as a unit;
a priority sequence of a sidelink service;
a mapping between a priority level and a PPPP;
a mapping between the PPPP and a logical channel priority;
a priority threshold value; or
a threshold value for the sending power difference between two links.

At operation 2, in some embodiments, the base station sends resource related information to UE2 after receiving the auxiliary information sent by UE1. The resource related information includes one of the following:

frequency domain information of an LTE sidelink or an NR sidelink, which may include one of the following: frequency point information, resource block information, or index information;
time domain information of the LTE sidelink or the NR sidelink, which may include one of the following: frame information, subframe information, slot information, symbol information, time domain (frame/subframe/slot/symbol) pattern information, time domain (frame/subframe/slot/symbol) index information, offset information, or period information;
resource pool information of the LTE sidelink or the NR sidelink, which may include one of the following: time domain information, frequency domain information, or resource pool index information;
a sending or receiving indication; or
system information, including one of the following: LTE, NR, R14, R15, or R16.
UE2 determines a sidelink discovery/communication sending or reception resource according to the resource related information.

At operation 3, in some embodiments, UE2 sends the resource related information to UE by means of a PC5 interface. UE determines a sidelink discovery/communication sending or reception resource according to the resource related information.

Operation 4, in some embodiments, the base station sends the resource related information to UET. UE determines a sidelink discovery/communication sending or reception resource according to the resource related information.

It is noted that the chronological order between the above operations is not limited.

Exemplary Embodiment 3

The embodiment is a third method for achieving coexistence of LTE V2X and NR V2X by a base station on the basis of auxiliary information reported by UE. FIG. 2 is a schematic diagram of a scene of the present embodiment. In FIG. 2A, UE sends LTE sidelink discovery or communication data to UE2, while UET sends NR sidelink discovery or communication data to UE3. In FIG. 2B, UE1 receives LTE sidelink discovery or communication data sent by UE2, while UET sends NR sidelink discovery or communication data to UE3. For UET, sending of the NR sidelink and sending or reception of the LTE sidelink may overlap in a time-domain position. For example, in FIG. 2A, under the condition of sending of the NR sidelink and the LTE sidelink in the same time-domain resource, a maximum sending power of the UE is limited, the sending power needs to be allocated among a plurality of links, and there may be large interference to a reception end. In FIG. 2B, the sending of the NR sidelink is likely to cause large interference to the reception of the LTE sidelink. The method of the embodiment is also applicable under the condition that the NR sidelink is replaced by the LTE sidelink and the LTE sidelink is replaced by the NR sidelink. In this embodiment, UE1 is accessed in a dual-connection mode, and the base station 1 and the base station 2 provide resources for UE1.

Figure 7:
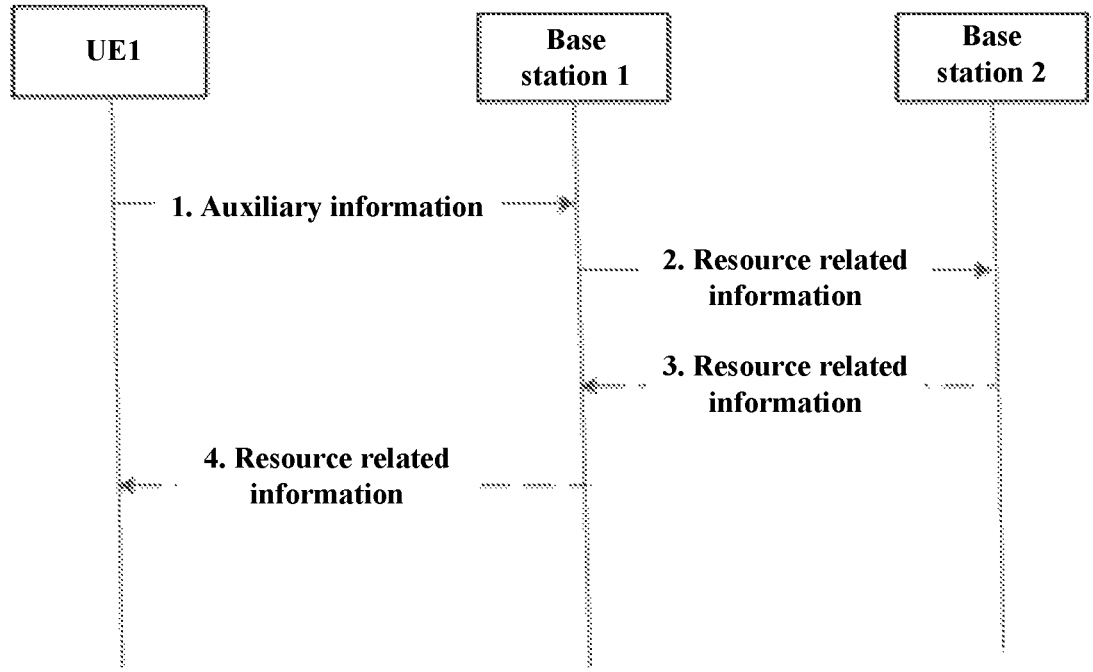
FIG. 7 is a schematic diagram of exemplary embodiment 3 according to the present disclosure.

FIG. 7 is a schematic diagram of a scene according to the exemplary embodiment 3 of the present disclosure. As shown in FIG. 7, the method of the embodiment includes the following operations.

At operation 1, UE1 sends auxiliary information to a base station 1. The auxiliary information at least includes one of the following:

indication information of IDC capability, an IDC indication, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, TDM auxiliary information, sending power information for an LTE sidelink, sending power information for an NR sidelink, sending power difference information, identification information of opposite end UE, identification information of a base station or cell serving the opposite end UE, affected sidelink BWP information, sidelink BWP information of the interference source, or suggested sidelink BWP information. Specific meanings or values of the above information are set forth in the embodiment 1.

In some embodiments, UE1 sends the auxiliary information to the base station 1 after meeting at least one of the following conditions:

Condition 1: the UE has an IDC problem which is not able to be solved by itself.

Condition 2: a priority value of the LTE sidelink and/or the NR sidelink is smaller than a priority threshold value. The priority threshold value may be configured by the base station or the V2X server for the UE, or a predefined value.

Condition 3: a sending power difference of the UE in the LTE sidelink and the NR sidelink is larger than a configured threshold value for the sending power difference. The threshold value may be configured by the base station or the V2X server for the UE, or is a predefined value. In some embodiments, the UE may be configured with a threshold value for the sending power difference and a corresponding V2X service type (which may be represented by V2X service type, or V2X service identification, or destination ID).

At operation 1a, in some embodiments, before UE1 sends the auxiliary information to the base station 1, UE1 receives configuration information sent by the base station 1. The configuration information includes one of the following:

indication information allowing sending of the auxiliary information;

a length of time which takes frame or subframe or slot or symbol as a unit;

an amount of time, within which it is allowed to perform no sending on configured resources, in the specified length of time, wherein the amount of time takes frame or subframe or slot or symbol as a unit;

a priority sequence of a sidelink service;

a mapping between a priority level and a PPPP;

a mapping between the PPPP and a logical channel priority;

a priority threshold value; or a threshold value for the sending power difference between two links.

At operation 2, in some embodiments, the base station 1 sends the resource related information to the base station 2 by means of X2 or Xn signaling. The resource related information at least includes one of the following:

an IDC indication, frequency domain information of a resource used by a sidelink, time domain information of the resource used by the sidelink, resource pool information of the resource used by the sidelink, affected sidelink BWP information, sidelink BWP information of the interference source, suggested sidelink BWP information, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, or TDM auxiliary information. The resource used by the sidelink is the resource used by the LTE sidelink or the NR sidelink configured by the base station 1 for UE1.

At operation 3, in some embodiments, the base station 2 sends the resource related information to the base station 1 by means of the X2 or Xn signaling. The resource related information includes one of the following:

frequency domain information of an LTE sidelink or an NR sidelink, which may include one of the following: frequency point information, resource block information, or index information;

time domain information of the LTE sidelink or the NR sidelink, which may include one of the following: frame information, subframe information, slot information, symbol information, time domain (frame/subframe/slot/symbol) pattern information, time domain (frame/subframe/slot/symbol) index information, offset information, or period information;

resource pool information of the LTE sidelink or the NR sidelink, which may include one of the following: time domain information, frequency domain information, or resource pool index information;

a sending or receiving indication; or system information, including one of the following: LTE, NR, R14, R15, or R16.

At operation 4, in some embodiments, the base station 1 sends the resource related information to UET. UET determines a sidelink discovery/communication sending or reception resource according to the resource related information. In some embodiments, similar to the embodiment 1, UET may send the resource related information to UE2 or UE3 by means of a PC5 interface. Under the condition that UE2 (or UE3) and UET are served by the same base station, the base station 1 sends the resource related information to UE2 or UE3. UE2 or UE3 determines a sidelink discovery/communication sending or reception resource according to the resource related information.

It is noted that the chronological order between the above operations is not limited.

Exemplary Embodiment 4

The embodiment is a first method for achieving coexistence of LTE V2X and NR V2X by means of negotiation between UE. FIG. 2B is a schematic diagram of a scene of the present embodiment. In this embodiment, UET receives LTE sidelink discovery or communication data sent by UE2, while UET sends NR sidelink discovery or communication data to UE3. For UE, sending of the NR sidelink and reception of the LTE sidelink may overlap in a time-domain position, and the sending of the NR sidelink may cause interference to the reception of the LTE sidelink. The method is further suitable for the condition that UE receives the NR sidelink discovery or communication data from UE2 and meanwhile sends the LTE sidelink discovery or communication data to UE3. In this embodiment, UET and UE may be served by the base station, or be served by different base stations or be served without the base station.

Figure 8:
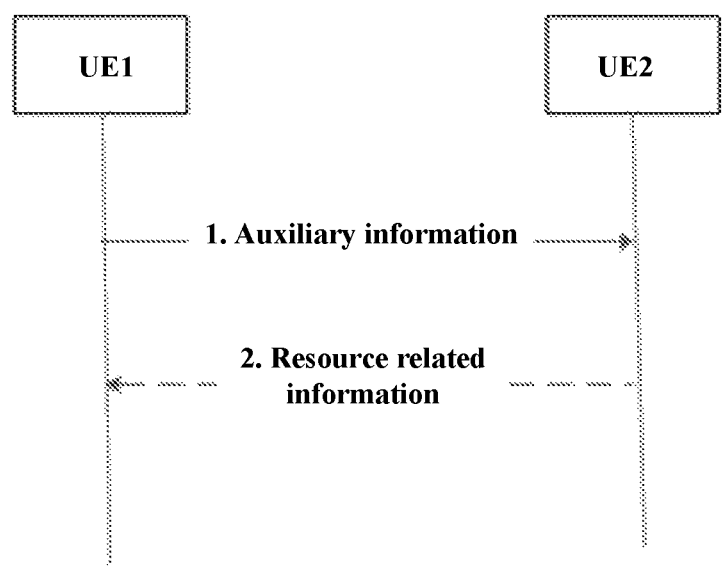
FIG. 8 is a schematic diagram of exemplary embodiment 4 according to the present disclosure.

FIG. 8 is a schematic diagram of a scene according to exemplary embodiment 4 of the present disclosure. As shown in FIG. 8, the method of the embodiment includes the following operations.

At operation 1, UET sends auxiliary information to UE2. The auxiliary information at least includes one of the following:

indication information of IDC capability, an IDC indication, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, or TDM auxiliary information. Specific meanings or values of the above information are set forth in the embodiment 1.

In some embodiments, UET may send the auxiliary information to UE2 by means of PC5 interface signaling, or PC5 interface RRC signaling, or MAC layer information, or PHY layer information (for example, sidelink control information).

In some embodiments, UET sends the auxiliary information to UE2 after meeting at least one of the following conditions:

Condition 1: the UE has an IDC problem which is not able to be solved by itself.

Condition 2: a priority value of the LTE sidelink and/or the NR sidelink is smaller than a priority threshold value. The priority threshold value may be configured by the base station or the V2X server for the UE, or a predefined value.

Condition 3: the priority that UE2 performs sending of the sidelink is smaller than the priority that UET performs sending of the sidelink.

At operation 1a, in some embodiments, before UET sends the auxiliary information to UE2, UE1 receives configuration information sent by the base station. The configuration information includes one of the following:

indication information allowing sending of the auxiliary information;
a length of time which takes frame or subframe or slot or symbol as a unit;
an amount of time, within which it is allowed to perform no sending on configured resources, in the specified length of time, wherein the amount of time takes frame or subframe or slot or symbol as a unit;
a priority sequence of a sidelink service;
a mapping between a priority level and a PPPP;
a mapping between the PPPP and a logical channel priority;
a priority threshold value; or In some embodiments, the base station may send the auxiliary information to UE by means of RRC messages, or system messages, or MAC layer information, or PHY layer information.

At operation 2, in some embodiments, after UET sends the auxiliary information to UE2, UE2 sends resource related information to UET. The resource related information includes one of the following:

frequency domain information of an LTE sidelink or an NR sidelink, which may include one of the following: frequency point information, resource block information, or index information;
time domain information of the LTE sidelink or the NR sidelink, which may include one of the following: frame information, subframe information, slot information, symbol information, time domain (frame/subframe/slot/symbol) pattern information, time domain (frame/subframe/slot/symbol) index information, offset information, or period information; resource pool information of the LTE sidelink or the NR sidelink, which may include one of the following: time domain information, frequency domain information, or resource pool index information;
a sending or receiving indication; or
system information, including one of the following: LTE, NR, R14, R15, or R16.

In some embodiments, UE2 may send the resource related information to UET by means of PC5 interface signaling, or PC5 interface RRC signaling, or MAC layer information, or PHY layer information (for example, sidelink control information).

It is noted that the chronological order between the above operations is not limited.

Exemplary Embodiment 5

The embodiment is a second method for achieving coexistence of LTE V2X and NR V2X by means of negotiation between UE. FIG. 2B is a schematic diagram of a scene of the present embodiment. In this embodiment, UET receives LTE sidelink discovery or communication data sent by UE2, while UET sends NR sidelink discovery or communication data to UE3. For UE, sending of the NR sidelink and reception of the LTE sidelink may overlap in a time-domain position, and the sending of the NR sidelink may cause interference to the reception of the LTE sidelink. The method is further suitable for the condition that UE receives the NR sidelink discovery or communication data from UE2 and meanwhile sends the LTE sidelink discovery or communication data to UE3. In this embodiment, UE2 is served by the base station 1, and UE may be served by the base station 1 or by another base station.

Figure 9:
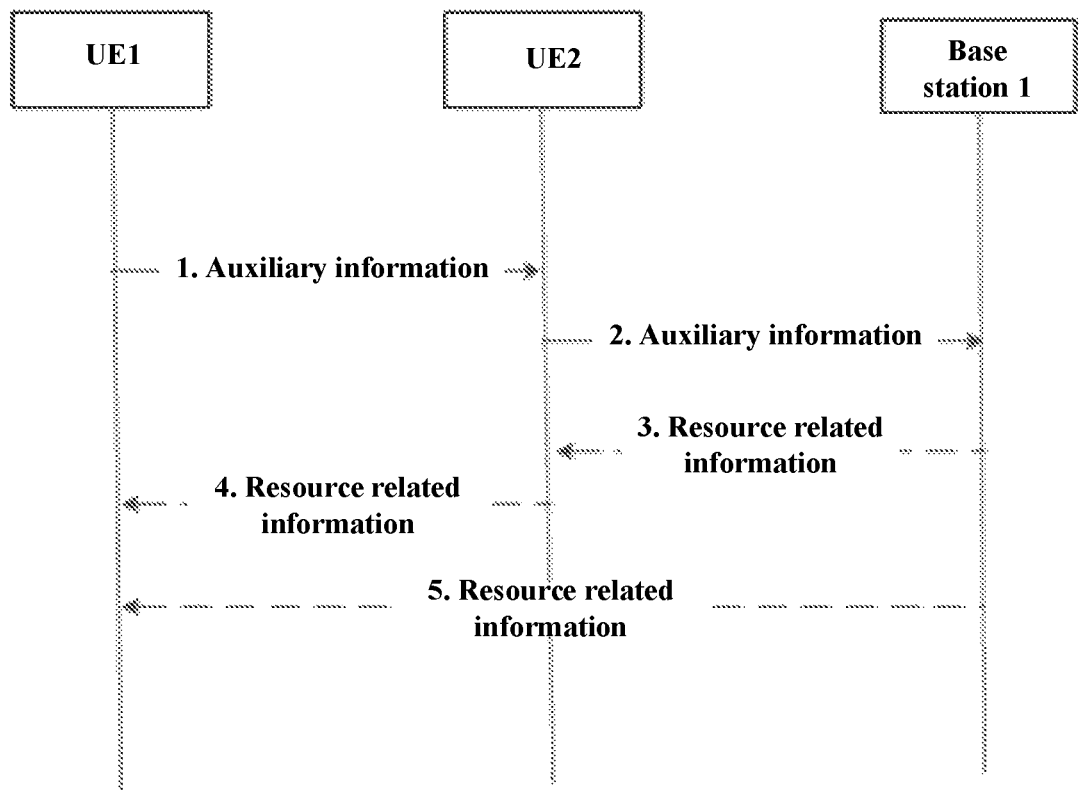
FIG. 9 is a schematic diagram of exemplary embodiment 5 according to the present disclosure.

FIG. 9 is a schematic diagram of a scene according to exemplary embodiment 5 of the present disclosure. As shown in FIG. 9, the method of the embodiment includes the following operations.

At operation 1, UET sends auxiliary information to UE2. The auxiliary information at least includes one of the following:

indication information of IDC capability, an IDC indication, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, or TDM auxiliary information. Specific meanings or values of the above information are set forth in the embodiment 1.

In some embodiments, UET may send the auxiliary information to UE2 by means of PC5 interface signaling, or PC5 interface RRC signaling, or MAC layer information, or PHY layer information (for example, sidelink control information).

In some embodiments, UET sends the auxiliary information to UE2 after meeting at least one of the following conditions:
  Condition 1: the UE has an IDC problem which is not able to be solved by itself.
  Condition 2: a priority value of the LTE sidelink and/or the NR sidelink is smaller than a priority threshold value. The priority threshold value may be configured by the base station or the V2X server for the UE, or a predefined value.
  Condition 3: the priority that UE2 performs sending of the sidelink is smaller than the priority that UET performs sending of the sidelink.

At operation 1a, in some embodiments, before UET sends the auxiliary information to UE2, UE1 receives configuration information sent by the base station. The configuration information includes one of the following:
  indication information allowing sending of the auxiliary information;
  a length of time which takes frame or subframe or slot or symbol as a unit;
  an amount of time, within which it is allowed to perform no sending on configured resources, in the specified length of time, wherein the amount of time takes frame or subframe or slot or symbol as a unit;
  a priority sequence of a sidelink service;
  a mapping between a priority level and a PPPP;
  a mapping between the PPPP and a logical channel priority; or
  a priority threshold value.

In some embodiments, the base station may send the auxiliary information to UE by means of RRC messages, or system messages, or MAC layer information, or PHY layer information.

At operation 2, UE2 sends auxiliary information to the base station. The auxiliary information at least includes one of the following:
  indication information of IDC capability, an IDC indication, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, TDM auxiliary information, identification information of opposite end UE, identification information of a base station or cell serving the opposite end UE, affected sidelink BWP information, sidelink BWP information of the interference source, or suggested sidelink BWP information.

At operation 3, in some embodiments, the base station sends resource related information to UE2 after receiving the auxiliary information sent by UE2. The resource related information includes one of the following:
  frequency domain information of an LTE sidelink or an NR sidelink, which may include one of the following: frequency point information, resource block information, or index information;
  time domain information of the LTE sidelink or the NR sidelink, which may include one of the following: frame information, subframe information, slot information, symbol information, time domain (frame/subframe/slot/symbol) pattern information, time domain (frame/subframe/slot/symbol) index information, offset information, or period information;
  resource pool information of the LTE sidelink or the NR sidelink, which may include one of the following: time domain information, frequency domain information, or resource pool index information;
  a sending or receiving indication; or
  system information, including one of the following: LTE, NR, R14, R15, or R16.

In some embodiments, the base station may send the resource related information to UE2 by means of the RRC messages, or the system messages, or the MAC layer information, or the PHY layer information.

At operation 4, in some embodiments, UE2 sends the resource related information to UE by means of a PC5 interface. UE determines a sidelink discovery/communication sending or reception resource according to the resource related information. In some embodiments, UE2 may send the resource related information to UET by means of PC5 interface signaling, or PC5 interface RRC signaling, or MAC layer information, or PHY layer information (for example, sidelink control information).

At operation 5, in some embodiments, under the condition that UE2 and UET are served by the same base station, the base station sends the resource related information to UE. UE1 determines a sidelink discovery/communication sending or reception resource according to the resource related information.

It is noted that the chronological order between the above operations is not limited.

Exemplary Embodiment 6

The embodiment is a method for achieving coexistence of LTE V2X and NR V2X by means of interactive combination of UE reporting and a base station. FIG. 2B is a schematic diagram of a scene of the present embodiment. In this embodiment, UE receives LTE sidelink discovery or communication data sent by UE2, while UE sends NR sidelink discovery or communication data to UE3. For UET, sending of the NR sidelink and reception of the LTE sidelink may overlap in a time-domain position, and the sending of the NR sidelink may cause interference to the reception of the LTE sidelink. The method is further suitable for the condition that UE1 receives the NR sidelink discovery or communication data from UE2 and meanwhile sends the LTE sidelink discovery or communication data to UE3. In this embodiment, UE1 is served by the base station 1, and UE2 may be served by the base station 2.

Figure 10:
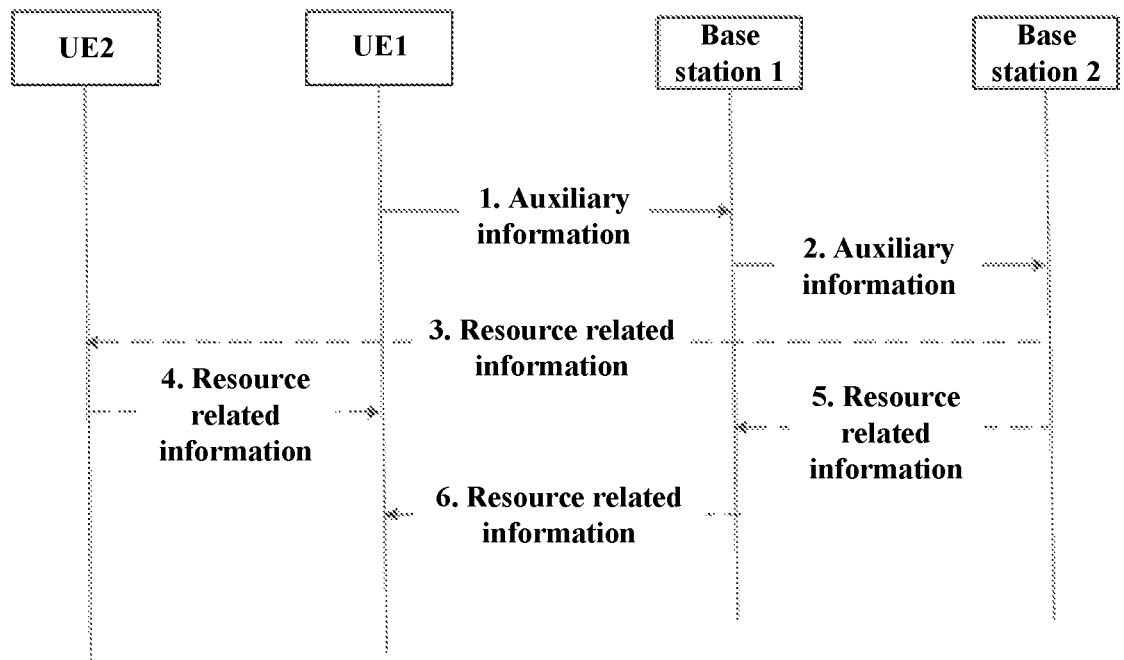
FIG. 10 is a schematic diagram of exemplary embodiment 6 according to the present disclosure.

FIG. 10 is a schematic diagram of exemplary embodiment 6 according to the present disclosure. As shown in FIG. 10, the method of the embodiment includes the following operations.

At operation 1, UE1 sends auxiliary information to the base station. The auxiliary information at least includes one of the following:

indication information of IDC capability, an IDC indication, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, TDM auxiliary information, identification information of opposite end UE, identification information of a base station or cell serving the opposite end UE, affected sidelink BWP information, sidelink BWP information of the interference source, or suggested sidelink BWP information. Specific meanings or values of the above information are set forth in the embodiment 1.

In some embodiments, UE1 sends the auxiliary information to the base station after meeting at least one of the following conditions:

Condition 1: the UE has an IDC problem which is not able to be solved by itself.

Condition 2: a priority value of the LTE sidelink and/or the NR sidelink is smaller than a priority threshold value. The priority threshold value may be configured by the base station or the V2X server for the UE, or a predefined value. The priority threshold value may be a PPPP value, or a logical channel priority threshold value, or a priority level threshold value.

Condition 3: the priority that UE2 performs sending of the sidelink is smaller than the priority that UE1 performs sending of the sidelink.

At operation 1a, in some embodiments, before UE1 sends the auxiliary information to the base station, UE1 receives configuration information sent by the base station. The configuration information includes one of the following:

indication information allowing sending of the auxiliary information;
 a length of time which takes frame or subframe or slot or symbol as a unit;
 an amount of time, within which it is allowed to perform no sending on configured resources, in the specified length of time, wherein the amount of time takes frame or subframe or slot or symbol as a unit;
 a priority sequence of a sidelink service;
 a mapping between a priority level and a PPPP;
 a mapping between the PPPP and a logical channel priority;
 a priority threshold value; or
 a threshold value for the sending power difference between two links.

In some embodiments, the base station may send the auxiliary information to UE by means of RRC messages, or system messages, or MAC layer information, or PHY layer information.

At operation 2, the base station 1 sends the auxiliary information to the base station 2. The auxiliary information at least includes one of the following:

indication information of IDC capability, an IDC indication, frequency domain information of a resource used by a sidelink, time domain information of the resource used by the sidelink, resource pool information of the resource used by the sidelink, affected sidelink BWP information, sidelink BWP information of the interference source, suggested sidelink BWP information, affected service type information or service type information of an interference source, information of an affected system or information of a system of the interference source, indication information of an interference type, affected or frequency domain information of the interference source, affected or time domain information of the interference source, affected or resource pool information of the interference source, suggested frequency domain information, suggested time domain information, suggested resource pool information, TDM auxiliary information, identification information of opposite end UE, identification information of a base station or cell serving the opposite end UE, affected sidelink BWP information, sidelink BWP information of the interference source, or suggested sidelink BWP information. The resource used by the sidelink is the resource used by the LTE sidelink or the NR sidelink configured by the base station 1 for UE. Specific meanings or values of the above information are set forth in the embodiment 1.

At operation 3, in some embodiments, the base station 2 sends resource related information to UE2 after receiving the auxiliary information sent by the base station 1. The resource related information includes one of the following:

frequency domain information of an LTE sidelink or an NR sidelink, which may include one of the following: frequency point information, resource block information, or index information;
 time domain information of the LTE sidelink or the NR sidelink, which may include one of the following: frame information, subframe information, slot information, symbol information, time domain (frame/subframe/slot/symbol) pattern information, time domain (frame/subframe/slot/symbol) index information, offset information, or period information;
 resource pool information of the LTE sidelink or the NR sidelink, which may include one of the following: time domain information, frequency domain information, or resource pool index information;
 a sending or receiving indication; or
 system information, including one of the following: LTE, NR, R14, R15, or R16.

In some embodiments, the base station may send the resource related information to UE2 by means of the RRC messages, or the system messages, or the MAC layer information, or the PHY layer information.

At operation 4, in some embodiments, UE2 sends the resource related information to UE by means of a PC5 interface. UE determines a sidelink discovery/communication sending or reception resource according to the resource related information. In some embodiments, UE2 may send the resource related information to UET by means of PC5 interface signaling, or PC5 interface RRC signaling, or MAC layer information, or PHY layer information (for example, sidelink control information).

At operation 5, in some embodiments, the base station 2 sends the resource related information to the base station 1.

At operation 6, in some embodiments, the base station 1 sends the resource related information to UE, and UE determines a sidelink discovery/communication sending or reception resource according to the resource related information.

It is noted that the chronological order between the above operations is not limited.

Exemplary Embodiment 7

The embodiment is a method for determining a priority sequence between an LTE sidelink and an NR sidelink. FIG.

2 is a schematic diagram of a scene of the present embodiment. In FIG. 2A, UET sends LTE sidelink discovery or communication data to UE2, while UET sends NR sidelink discovery or communication data to UE3. In FIG. 2B, UE receives LTE sidelink discovery or communication data sent by UE2, while UET sends NR sidelink discovery or communication data to UE3. For UE, sending of the NR sidelink and sending or reception of the LTE sidelink may overlap in a time-domain position. For example, in FIG. 2A, under the condition of sending of the NR sidelink and the LTE sidelink in the same time-domain resource, a maximum sending power of the UE is limited, the sending power needs to be allocated among a plurality of links, and there may be large interference to a reception end. In FIG. 2B, the sending of the NR sidelink is likely to cause large interference to the reception of the LTE sidelink. The method of the embodiment is also applicable under the condition that the NR sidelink is replaced by the LTE sidelink and the LTE sidelink is replaced by the NR sidelink.

Under the condition that UET performs the LTE sidelink and the NR sidelink simultaneously, the priority of the two links may be determined according to one of the following methods.

1. Sidelink communication is prioritized higher than sidelink discovery by default.
2. Sidelink discovery is prioritized higher than sidelink communication by default.
3. The LTE sidelink is prioritized higher than the NR sidelink by default.
4. The NR sidelink is prioritized higher than the LTE sidelink by default.
5. R14 format priority is higher than R15 or R16 format priority by default.
6. A basic safety service is prioritized higher than a non-basic safety service.
7. The UE receives a sidelink related priority sequence list from the base station or a core network element or the V2X server.
8. The priority is determined according to the PPPP values of the LTE sidelink and the NR sidelink, and the link with the lower PPPP value has higher priority. The UE may obtain the PPPP value of the NR sidelink by means of one of the following methods.

1) The UE receives the PPPP value corresponding to the NR sidelink from the base station or the core network element or the V2X server.
2) The UE obtains a mapping relation between the priority level and the PPPP from the base station or the core network element or the V2X server.

Under the condition that the time domain resources of the LTE sidelink and the NR sidelink overlap, the UE may adjust a sending resource of the sidelink with the lower priority, or adjust a sending power of the sidelink with the lower priority, or send auxiliary information to the sender UE of the sidelink with the lower priority, or send the auxiliary information to the base station according to the determined priority relationship between the LTE sidelink and the NR sidelink, so as to adjust the sending resource of the sender of the sidelink with the lower priority.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Embodiment 2

The embodiment provides an apparatus for transmitting information. The apparatus is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

According to one embodiment of the present disclosure, provided is an apparatus for transmitting information, applied to a terminal which simultaneously performs an NR sidelink service and an LTE sidelink service. The apparatus includes:

a first transmission module, configured to transmit auxiliary information to a first base station, wherein the auxiliary information is configured for the first base station to generate resource related information.

By means of the operation described above, a terminal, which simultaneously performs an NR sidelink service and an LTE sidelink service, transmits auxiliary information to the base station, and the base station may generate resource related information according to the auxiliary information, so as to instruct the terminal to prevent interference between the sidelink services of two systems. By employing the solution, the interference among the sidelink services of a plurality of systems is prevented, the data transmission efficiency is improved, and the problem that interference exists when the terminal carries out the sidelink services of the plurality of systems in the related art is solved.

According to another embodiment of the present disclosure, provided is an apparatus for transmitting information, applied to a terminal which simultaneously performs an NR sidelink service and an LTE sidelink service. The apparatus includes:

a second transmission module, configured to transmit auxiliary information to a second terminal.

By employing the solution, the interference among the sidelink services of a plurality of systems is prevented, the data transmission efficiency is improved, and the problem that interference exists when the terminal carries out the sidelink services of the plurality of systems in the related art is solved.

According to another embodiment of the present disclosure, provided is an apparatus for transmitting information, including:

a third obtaining module, configured to obtain auxiliary information transmitted by a first terminal, wherein the first terminal is a terminal which simultaneously performs an NR sidelink service and an LTE sidelink service; and
a third transmission module, configured to transmit first resource related information to a second base station, wherein the first resource related information is determined according to the auxiliary information.

By employing the solution, the interference among the sidelink services of a plurality of systems is prevented, the data transmission efficiency is improved, and the problem that interference exists when the terminal carries out the sidelink services of the plurality of systems in the related art is solved.

According to another embodiment of the present disclosure, provided is an apparatus for transmitting information, including:

a fourth reception module, configured to receive priority related information; and a fourth determination module, configured to determine a priority sequence between an LTE sidelink and an NR sidelink.

By employing the solution, the interference among the sidelink services of a plurality of systems is prevented, the data transmission efficiency is improved, and the problem that interference exists when the terminal carries out the sidelink services of the plurality of systems in the related art is solved.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Embodiment 3

The embodiment of the present disclosure provides a storage medium. In this embodiment, the storage medium described above may be configured to store a program code for execute the following operation.

At operation S1, a first terminal which simultaneously performs an NR sidelink service and an LTE sidelink service transmits auxiliary information to a first base station.

The auxiliary information is configured for the first base station to generate resource related information.

In this embodiment, the storage medium described above may include: a USB flash disk, a read-only memory (ROM), a random access memory (RAM), a mobile hard disk, a magnetic disk, an optical disk and other media capable of storing the program code.

The embodiment of the present disclosure further provides an electronic apparatus, including a memory and a processor. The memory stores a computer program, and the processor is configured to run the computer program to execute the operations of any one of the above method embodiments.

In some embodiments, the electronic apparatus may further include a transmission apparatus and an input/output device. The transmission apparatus is connected to the processor described above and the input/output device is connected to the processor described above.

In this embodiment, the processor described above may be configured to execute, by means of the computer program, the following operation.

At operation S1, a first terminal which simultaneously performs an NR sidelink service and an LTE sidelink service transmits auxiliary information to a first base station.

The auxiliary information is configured for the first base station to generate resource related information.

Specific examples in this embodiment may be referred to the examples described in the above embodiments and implementations, which are not described in detail herein.

Specific examples in this embodiment may be referred to the examples described in the above embodiments and implementations, which are not described in detail herein.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

What is claimed is:

1. A method for transmitting information, comprising:
transmitting, by a first terminal which simultaneously performs a new radio (NR) sidelink service and a long term evolution (LTE) sidelink service, auxiliary information to a second terminal when determining that the first terminal meets at least one of following conditions: a priority value of an LTE sidelink and/or an NR sidelink is smaller than a priority threshold value; a priority that the second terminal performs sending of a sidelink is smaller than a priority that the first terminal performs sending of a sidelink, wherein the auxiliary information is configured for the second terminal to generate resource related information;
wherein the auxiliary information comprises at least one of the following: affected service type information, service type information of an interference source, information of an affected system, information of a system of interference source, indication information of an interference type, affected frequency domain information, frequency domain information of the interference source, affected time domain information, time domain information of the interference source, affected resource pool information, resource pool information of the interference source, suggested frequency domain information, suggested time domain information, suggested resource pool information, sending power information for an LTE sidelink, sending power information for an NR sidelink, sending power difference information, identification information of opposite end User Equipment (UE), identification information of a base station or cell serving the opposite end UE, affected sidelink bandwidth part (BWP) information, sidelink BWP information of the interference source, and suggested sidelink BWP information.

2. The method of claim 1, wherein
the method further comprises: transmitting, by the first terminal which simultaneously performs the NR sidelink service and the LTE sidelink service, auxiliary information to a first base station when determining that the first terminal meets at least one of following conditions: a priority value of the NR sidelink and/or the LTE sidelink is smaller than a priority threshold value; the priority value of the NR sidelink and/or the LTE sidelink is larger than a priority threshold value; and a sending power difference of the first terminal in the NR sidelink and the LTE sidelink is larger than a threshold value, wherein the auxiliary information is configured for the first base station to generate the resource related information;

wherein before transmitting the auxiliary information to the first base station from the first terminal, the method further comprises:

receiving, by the first terminal, configuration information sent by the first base station, wherein the configuration information comprises at least one of the following:

indication information allowing the first terminal to transmit the auxiliary information;

a specified length of time;

an amount of time, within which it is allowed to perform no sending on configured resources, in the specified length of time;

a sidelink related priority sequence list;

a mapping relation between a sidelink service flow priority level and a prose per packet priority (PPPP);

a mapping relation between the PPPP and a logical channel priority level;

a mapping relation between the PPPP and 5QI;

a mapping relation between the PPPP and a quality of service flow identifier (QFI);

a mapping relation between the PPPP and a destination identifier (ID);

a priority threshold value; and a threshold value for a sending power difference between NR sidelink and LTE sidelink.

3. The method of claim 2, wherein after transmitting the auxiliary information to the first base station by the first terminal, the method further comprises:

receiving resource related information transmitted by the first base station, wherein the resource related information comprises at least one of the following:

frequency domain information of an LTE sidelink or an NR sidelink;

time domain information of the LTE sidelink or the NR sidelink;

resource pool information of the LTE sidelink or the NR sidelink;

information indicating that a time domain resource or a frequency domain resource or a resource pool is used for sending;

information indicating that the time domain resource or the frequency domain resource or the resource pool is used for reception;

communication system information;

sidelink bandwidth part (BWP) information; and beam related information.

4. The method of claim 3, wherein the frequency domain information comprises one of the following: frequency point information, resource block (RB) information, index information, a position of an initial RB, the number of sub-channels, or the number of RBs;

the time domain information comprises one of the following: frame information, subframe information, slot information, symbol information, time domain pattern information, time domain index information, offset information, or period information;

the resource pool information comprises one of the following: time domain information, frequency domain information, resource pool index information, version information, or radio access technology (RAT) information; and the sidelink BWP information comprises one of the following: a BWP index, a BWP bandwidth, a BWP position, subcarrier spacing, or a connection point (CP).

5. The method of claim 3, wherein the first terminal forwards the resource related information to a second terminal, wherein the first terminal forwards the resource related information to the second terminal by means of PC5 interface signaling, or PC5 interface radio resource control (RRC) signaling, or media access control (MAC) address layer information, or physical (PHY) layer information.

6. The method of claim 3, wherein when both the first terminal and a second terminal are served by the first base station, at least one of the first terminal and the second terminal receives the resource related information transmitted by the first base station.

7. The method of claim 1, wherein after transmitting the auxiliary information to the second terminal, the method further comprises:

receiving resource related information transmitted by the second terminal, wherein the resource related information comprises at least one of the following:

frequency domain information of an LTE sidelink or an NR sidelink;

time domain information of the LTE sidelink or the NR sidelink;

resource pool information of the LTE sidelink or the NR sidelink;

information indicating that a time domain resource or a frequency domain resource or a resource pool is used for sending;

information indicating that the time domain resource or the frequency domain resource or the resource pool is used for reception;

communication system information;

sidelink bandwidth part (BWP) information; and beam related information.

8. A method for transmitting information, comprising:

obtaining, by a first base station, auxiliary information transmitted by a first terminal, wherein the first terminal is a terminal which simultaneously performs a new radio (NR) sidelink service and a long term evolution (LTE) sidelink service, wherein the auxiliary information is information transmitted when determining that the first terminal meets at least one of the following conditions: a priority value of an NR sidelink and/or an LTE sidelink is smaller than a priority threshold value; the priority value of the NR sidelink and/or the LTE sidelink is larger than a priority threshold value; and a sending power difference of the first terminal in the NR sidelink and the LTE sidelink is larger than a threshold value; and transmitting, by the first base station, first resource related information to a second base station, wherein the first resource related information is determined according to the auxiliary information;

wherein the auxiliary information comprises at least one of the following: affected service type information, service type information of an interference source, information of an affected system, information of a system of interference source, indication information of an interference type, affected frequency domain information, frequency domain information of the interference source, affected time domain information, time domain information of the interference source, affected resource pool information, resource pool information of the interference source, suggested frequency domain information, suggested time domain information, suggested resource pool information, sending power information for an LTE sidelink, sending power information for an NR sidelink, sending power difference information, identification information of opposite end User Equipment (UE), identification information of a base station or cell serving the opposite end UE, affected sidelink bandwidth part (BWP) information, sidelink BWP information of the interference source, and suggested sidelink BWP information.

9. The method of claim 8, wherein the first resource related information comprises at least one of the following: an in-device coexistence (IDC) indication, frequency domain information of a resource used by a sidelink, time domain information of the resource used by the sidelink, resource pool information of the resource used by the sidelink, affected sidelink BWP information, sidelink BWP information of the interference source, suggested sidelink BWP information, affected service type information, service type information of an interference source, information of an affected system, information of a system of interference source, indication information of an interference type, affected frequency domain information, frequency domain information of the interference source, affected time domain information, time domain information of the interference source, affected resource pool information, resource pool information of the interference source, suggested frequency domain information, suggested time domain information, suggested resource pool information, and time division multiplexing (TDM) auxiliary information, wherein the resource used by the sidelink is a resource used by an LTE sidelink or an NR sidelink configured by the first base station for the first terminal.

10. The method of claim 8, wherein after transmitting, by the first base station, the first resource related information to the second base station, the method further comprises:
receiving second resource related information transmitted by the second base station, wherein the second resource related information comprises at least one of the following:
frequency domain information of an LTE sidelink or an NR sidelink;
time domain information of the LTE sidelink or the NR sidelink;
resource pool information of the LTE sidelink or the NR sidelink;
information indicating that a time domain resource or a frequency domain resource or a resource pool is used for sending;
information indicating that the time domain resource or the frequency domain resource or the resource pool is used for reception;
communication system information;
sidelink BWP information; and
beam related information.

11. The method of claim 10, wherein after receiving, by the first base station, the second resource related information transmitted by the second base station, the method further comprises:
transmitting, by the first base station, the second resource related information to the first terminal.

12. An apparatus for transmitting information, applied to a terminal which simultaneously performs a new radio (NR) sidelink service and a long term evolution (LTE) sidelink service, and comprising a memory storing instructions and a processor in communication with the memory, wherein the processor, is configured to executing the instruction to performed the method of claim 1.

13. A non-transitory computer-readable storage medium, wherein the non-transitory computer-readable storage medium stores a computer program, the computer program being configured to execute the method of claim 1 at runtime.

14. An apparatus for transmitting information, comprising a memory storing instructions and a processor in communication with the memory, wherein the processor, is configured to executing the instruction to performed the method of claim 8.

* * * * *